United States Patent
Ogata et al.

(10) Patent No.: US 7,406,684 B2
(45) Date of Patent: Jul. 29, 2008

(54) COMPILER, DYNAMIC COMPILER, AND REPLAY COMPILER

(75) Inventors: Kazunori Ogata, Fujisawa (JP); Tamiya Onodera, Ageo (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 11/042,722

(22) Filed: Jan. 25, 2005

(65) Prior Publication Data

US 2005/0177821 A1 Aug. 11, 2005

(30) Foreign Application Priority Data

Jan. 28, 2004 (JP) ............................. 2004-020213

(51) Int. Cl.
*G06F 9/45* (2006.01)
(52) U.S. Cl. ..................... 717/140; 717/145; 717/148
(58) Field of Classification Search ................ 717/140, 717/145, 148
See application file for complete search history.

(56) References Cited

U.S. PATENT DOCUMENTS

| | | | | |
|---|---|---|---|---|
| 6,078,744 A | * | 6/2000 | Wolczko et al. | 717/153 |
| 6,606,743 B1 | * | 8/2003 | Raz et al. | 717/148 |
| 2002/0040470 A1 | * | 4/2002 | Guthrie et al. | 717/126 |
| 2002/0144240 A1 | * | 10/2002 | Lueh et al. | 717/136 |
| 2004/0083467 A1 | * | 4/2004 | Hanley et al. | 717/148 |
| 2005/0144602 A1 | * | 6/2005 | Ngai et al. | 717/151 |

OTHER PUBLICATIONS

Konno et al. "Offset-safe Compilation Method for Fixed-size Code Area Managment," Research Disclosure (Japan), Nov. 1998, vol. 41, No. 515, article 415108.

* cited by examiner

*Primary Examiner*—Wei Y. Zhen
*Assistant Examiner*—Junchun Wu
(74) *Attorney, Agent, or Firm*—Louis P. Herzberg

(57) ABSTRACT

The same executable instruction stream as an executable instruction stream generated by a dynamic compiler is reproduced to facilitate debugging of the dynamic compiler. Provides compiler program for computer functioning as: an execution status obtaining section for obtaining an execution status of the program; a dynamic compilation section for compiling one of the partial programs to be executed during execution of the program; an execution status recording section for recording the execution status in a memory area allocated on a memory of the computer; a file reading section for reading a file containing contents of the memory area allocated on the memory; and a replay compilation section for compiling the one partial program on the basis of the execution status obtained from the file to generate the same executable instruction stream as the executable instruction stream generated by the dynamic compilation section during the execution of the program.

15 Claims, 6 Drawing Sheets

COMPILER, DYNAMIC COMPILER, AND REPLAY COMPILER

FIELD OF THE INVENTION

The present invention relates to a compiler program, a dynamic compiler program, a replay compiler program, a replay compiler, a compilation method, and a recording medium. In particular, the present invention relates to a compiler program, dynamic compiler program, replay compiler program, replay compiler, compilation method, and a recording medium for reproducing executable instruction streams compiled by a dynamic compiler.

BACKGROUND

Dynamic compilers such as JIT (Just In Time) compilers, have been used in Java® program execution environments in recent years. When the need for executing an uncompiled portion of a program such as a Java® application arises during execution of the program, a dynamic compiler compiles a partial program in the program that is to be executed. This prevents a delay in activation of the program, which would arise if the entire program were compiled first, and also enables the program to be executed faster than interpreter execution.

For a faster execution of a program, a dynamic compiler obtains the status of execution of the program when compiling a partial program and compiles the partial program to generate an executable instruction stream optimized and compiled for that execution status. Information about the execution status which a dynamic compiler refers to in order to optimize an executable instruction stream includes information as to whether a class has been loaded or not and profile data during execution of the program. Even for a partial program that has been optimized for a certain execution status and compiled, the dynamic compiler may possibly further optimize and compile the partial program for a different execution status.

During debugging such a dynamic compiler, a problem in the dynamic compiler may not be able to be reproduced even if it compiles the same partial program, because the operation of the dynamic compiler changes depending on the execution status of the program. Furthermore, when a dynamic compiler is debugged in an environment different from a runtime environment of a program where a problem occurred, the problem in the dynamic compiler may not be able to be reproduced because the execution status of the program varies from runtime environment to environment.

A technology for reproducing an executable instruction stream compiled by a dynamic compiler has been disclosed in which, if a storage area for an executable instruction stream becomes insufficient during the execution of the program, the executable instruction stream is discarded and the execution status of the program is temporarily held and, when subsequently the executable instruction stream is required again, that execution status is used to re-compile the executable instruction stream (see Non-Patent Document 1), K. Konno, H. Komatsu, K. Ishizaki, "Offset-safe Compilation Method for Fixed-size Code Area Management," Research Disclosure (Japan) 11-1998, v41, n415, article 415108

DISCLOSURE OF THE INVENTION

According to the technology disclosed in non-patent document 1, the same executable instruction stream that has been discarded can be reproduced during execution of the program. However, the technology does not consider replay compilation of the program that would be performed for debugging a dynamic compiler after the execution of the program.

SUMMARY OF THE INVENTION

An object of the present invention is to provide a compiler program, replay compiler, dynamic compiler program, replay compiler program, compilation method, and a recording medium that can solve the problem described above. The object is achieved by a combination of features set forth in the independent Claims. The dependent Claims define more advantageous specific examples of the present invention.

According to embodiments of the present invention, there are provided a compiler program and a dynamic compiler program, a replay compiler program, replay compiler, compilation method, and recording medium that relate to the compiler program, wherein the compiler program causes a computer to sequentially compile partial programs to be executed among a plurality of partial programs included in a program during execution of the program, causing the computer to function as: an execution status obtaining section for obtaining an execution status of the program; a dynamic compilation section for compiling one of the partial programs to be executed during execution of the program on the basis of the execution status to generate an executable instruction stream that differs depending on the execution status; an execution status recording section for recording the execution status in a memory area allocated on a memory of the computer; a file reading section for reading from the storage device a file containing contents of the memory area allocated on the memory, the file being stored in a storage device by the computer; and a replay compilation section for compiling the one partial program on the basis of the execution status obtained from the file to generate the same executable instruction stream as the executable instruction stream generated by the dynamic compilation section during the execution of the program. According to the present invention, the same execution instruction stream that has been generated by a dynamic compiler can be reproduced to facilitate debugging of the dynamic compiler.

The summary of the present invention provided above does not list all of the essential features of the present invention. Any sub-combination of the features can constitute the present invention.

DESCRIPTION OF SYMBOLS

- 10 ... Compiler system
- 90 ... Program execution system
- 100 ... Dynamic compiler
- 105 ... Memory
- 106 ... First area
- 107 ... Second area
- 110 ... Execution status obtaining section
- 115 ... Dynamic compilation section
- 120 ... Execution status recording section
- 125 ... Execution status deleting section
- 130 ... Partial program execution section
- 135 ... System dump unit
- 140 ... Storage device
- 150 ... Replay compiler
- 155 ... File reading section
- 160 ... Memory
- 161 ... First area
- 162 ... Second area
- 163 ... Third area
- 170 ... Replay compilation section
- 400 ... Memory area
- 405 ... Static memory area
- 406 ... Dynamic memory area
- 410 ... Identification information
- 415a, 465b ... Size
- 420a, 420b ... Pointer
- 425a, 425b ... Execution status
- 450 ... Memory area
- 451 ... Memory area
- 455 ... Static memory area
- 460 ... Identification information
- 465a, 465b ... Size
- 470a, 470b ... Pointer
- 475a, 475b ... Execution status
- 480 ... Work area
- 490 ... Used area
- 900 ... Computer
- 1000 ... CPU
- 1010 ... ROM
- 1020 ... RAM
- 1030 ... Communication interface
- 1040 ... Hard disk drive
- 1050 ... Flexible disk drive
- 1060 ... CD-ROM drive
- 1070 ... Input/Output chip
- 1075 ... Graphic controller
- 1080 ... Display device
- 1082 ... Host controller
- 1084 ... Input/Output controller
- 1090 ... Flexible disk
- 1095 ... CD-ROM

DETAILED DESCRIPTION OF THE INVENTION

The present invention provides a compiler program, replay compiler, dynamic compiler program, replay compiler program, compilation method, and a recording medium that can solve the problem described above. These are achieved by a combination of features set forth in the independent Claims. The dependent Claims define more advantageous specific examples of the present invention.

IN accordabce with embodiments of the present invention, there are provided a compiler program and a dynamic compiler program, a replay compiler program, replay compiler, compilation method, and recording medium that relate to the compiler program, wherein the compiler program causes a computer to sequentially compile partial programs to be executed among a plurality of partial programs included in a program during execution of the program, causing the computer to function as: an execution status obtaining section for obtaining an execution status of the program; a dynamic compilation section for compiling one of the partial programs to be executed during execution of the program on the basis of the execution status to generate an executable instruction stream that differs depending on the execution status; an execution status recording section for recording the execution status in a memory area allocated on a memory of the computer; a file reading section for reading from the storage device a file containing contents of the memory area allocated on the memory, the file being stored in a storage device by the computer; and a replay compilation section for compiling the one partial program on the basis of the execution status obtained from the file to generate the same executable instruction stream as the executable instruction stream generated by the dynamic compilation section during the execution of the program.

This description of the present invention does not list all of the essential features of the present invention. Any sub-combination of the features can constitute the present invention. The present invention will be described below with respect to embodiments of the present invention. However, the embodiments described below do not limit the present invention set forth in the appended claims and not all the combinations of the features described with respect to the embodiments are essential to the means for solving the problem according to the present invention.

Figure 1:
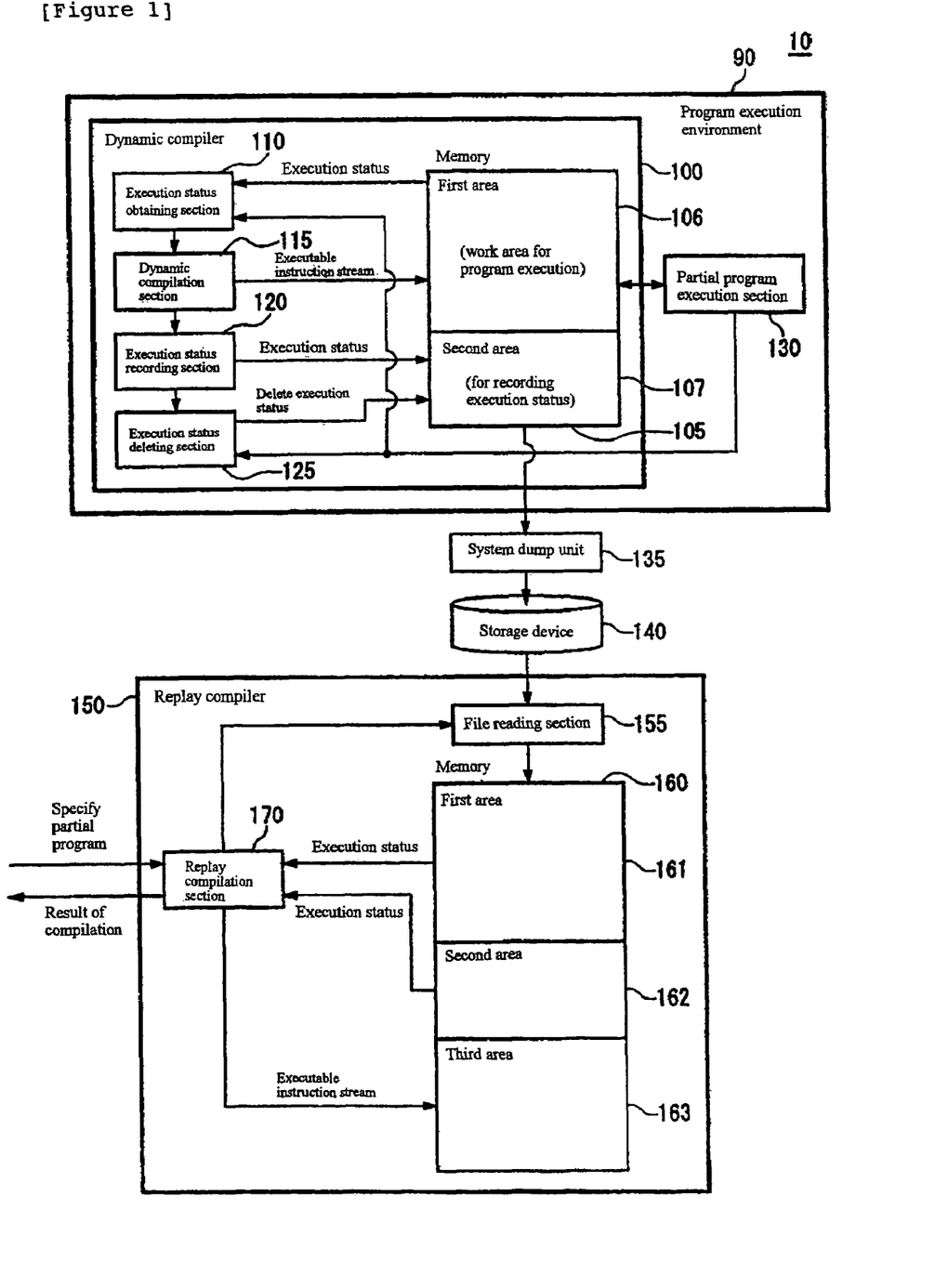
FIG. 1 shows a configuration of a compiler system 10 according to an embodiment of the present invention.

FIG. 1 shows a configuration of a compiler system 10 according to an embodiment. The compiler system 10 stores an execution status which has been referred to by a dynamic compiler 100 for optimizing compilation of a partial program during execution of a program in a storage device 140 as a file through means such as a system dump which dumps memory contents into a file. The execution status contained in the file is used by a replay compiler 150 to perform replay compilation to generate the same executable instruction stream that has been generated by the dynamic compiler 100. This allows a developer of the dynamic compiler 100 to reproduce a problem in the dynamic compiler 100, which may arise during compilation of the program, in the replay compiler 150 after the completion of the execution of the program. Thus, the debugging of the dynamic compiler 100 can efficiently be performed.

The compiler system 10 comprises a program execution system 90 including the dynamic compiler 100 that dynamically compiles on a portion by portion basis a program to be executed and a partial program execution section 130 that executes an executable instruction stream compiled by the dynamic compiler 100, a system dump unit 135 that stores an execution status of the program which has been referred to by the dynamic compiler 100 during compilation into the storage device 140, the storage device 140 such as a hard disk, and the replay compiler 150 that compiles to reproduce the same executable instruction stream that has been compiled by the dynamic compiler 100.

The program execution system 90 receives a direction to execute a program, such as a Java® byte code, that cannot directly be executed by a computer and executes the program through cooperation between the dynamic compiler 100 and the partial program execution section 130.

The dynamic compiler 100, which is implemented by executing a dynamic compiler program on a computer, sequentially compiles, among a plurality of partial programs contained in a program, partial programs to be executed during the execution of the program. The dynamic compiler 100 has a memory 105, an execution status obtaining section 110, a dynamic compilation section 115, an execution status recording section 120, and an execution status deleting section 125.

The memory 105 is an allocated memory area on a memory of the computer executing the dynamic compiler program. In particular, the memory 105 is a memory area reserved by the program execution system 90 by requesting memory allocation from an operating system of the computer, for example. The memory 105 may be a stack area or heap area for the dynamic compiler 100 and/or the partial program execution section 130, or a memory area allocated through an mmap system call.

The execution status obtaining section 110 obtains from the memory 105 an execution status of a program which is to be referred to by the dynamic compilation section 115 during compilation of a partial program. The dynamic compilation section 115 optimizes and compiles one partial program to be executed during execution of the program, according to the execution status. Thus, executable instruction streams generated vary depending on execution statuses. The dynamic compilation section 115 stores the generated executable instruction streams in the memory 105. The executable instruction streams generated by the dynamic compilation section 115 are then read and executed by the partial program execution section 130.

The execution status recording section 120 records in the memory 105 the execution status that has been referred to by the dynamic compilation section 115 in compiling the partial program. The execution status deleting section 125 deletes from the memory 105, among the execution statuses recorded in the memory 105 by the execution status recording unit 120, execution statuses which are unlikely to be referred to in replay compilation by the replay compiler 150.

The partial program execution section 130 executes executable instruction streams generated by the dynamic compiler 100 to perform the program. The partial program execution section 130 may include functions of a Java® virtual machine, for example and some of partial programs may be executed by an interpreter without being compiled by the dynamic compiler 100.

The system dump unit 135 stores a file containing contents in the memory 105 in the storage device 140. Execution of a program of the system dump unit 135 may be implemented by an operating system, for example, running on the computer that executes the dynamic compiler 100 and dumps the memory 105 on completion of the execution of a program to store the contents of the memory 105 in a file.

The replay compiler 150, which is implemented by running the replay compiler program on the computer, refers to execution status contained in a file stored in the storage device 140 to generate the same executable instruction stream that has been generated by the dynamic compiler 100. The computer functioning as the replay compiler 150 may be the same computer as that functioning as the dynamic compiler 100. Alternatively, it may be a different computer. The replay compiler 150 has a file reading section 155, a memory 160, and a replay compilation section 170.

The file reading section 155 reads a file that is stored in the storage device 140 by the system dump unit 135 on the computer functioning as the dynamic compiler 100 and contains the contents of the memory 105 from the storage device 140 and stores the file in the memory 160. The memory 160 is a memory area reserved and allocated on the memory of the computer running the replay compiler program in response to a request from the replay compiler 150.

The replay compilation section 170 receives specification of a partial program to which replay compilation should be applied from the developer of the dynamic compiler 100. Then, the replay compilation section 170 obtains the execution status of the specified partial program from data obtained from the file and stored in the memory 160. The replay compilation section 170 then compiles the partial program according to the execution status to generate the same executable instruction stream that has been generated by the dynamic compilation section 115 during execution of the program. The replay compilation section 170 may use a compilation module shared with the dynamic compilation section 115 to perform the replay compilation. Alternatively, the replay compilation may be performed by using a compilation module to which a code is added for outputting information used for debugging or other modifications are made. Using the same compilation module based on the same compilation algorithm as the compilation module of the dynamic compilation section 115 and the replay compilation section 170 in this way allows them to decisively operate using the same execution status as their inputs. As a result, the same executable instruction stream can be generated.

The replay compilation section 170 provides the result of the compilation, such as information for debugging, obtained from the execution of the replay compilation section 170 to the developer of the dynamic compiler 100.

Figure 2:
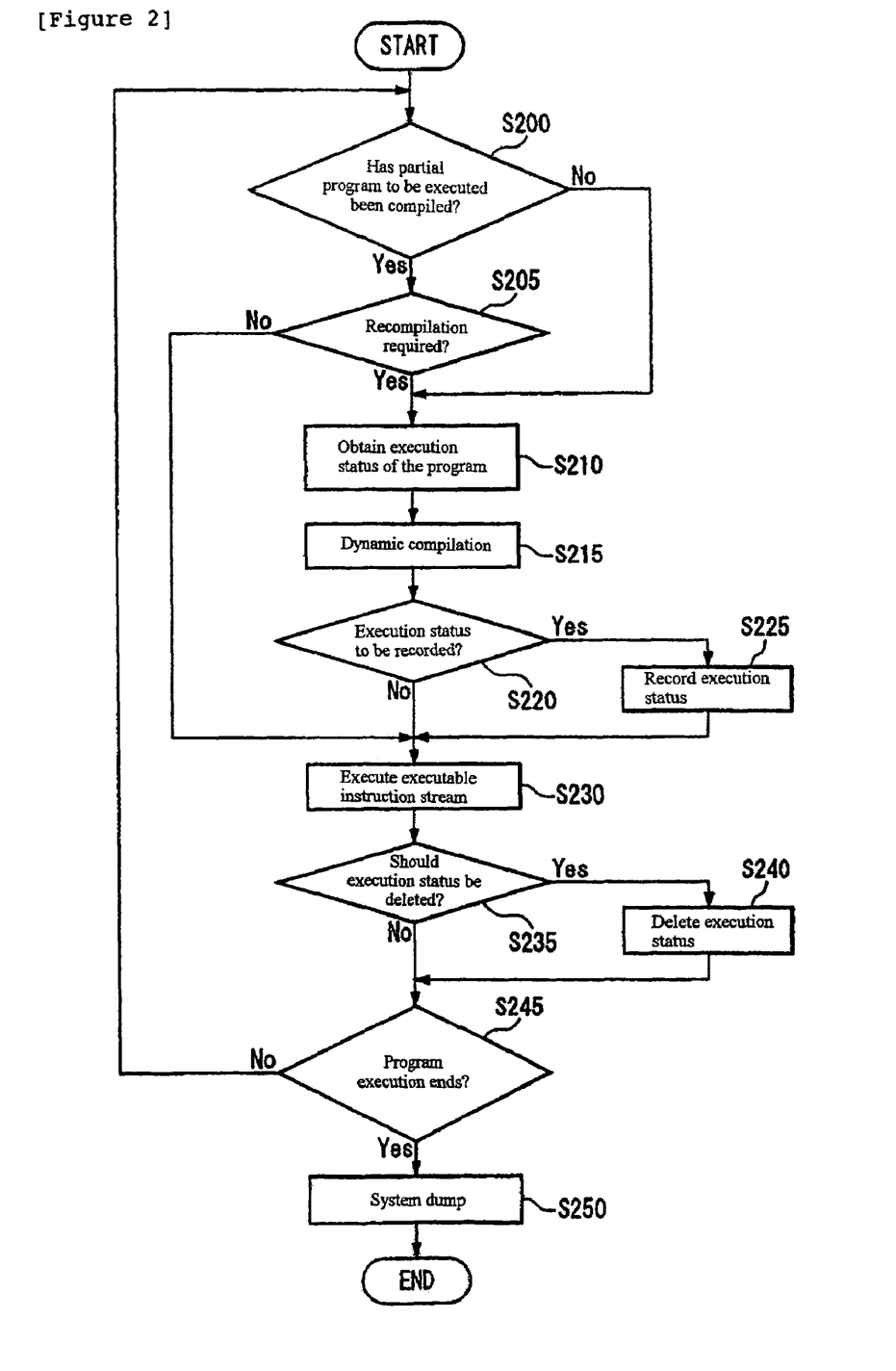
FIG. 2 shows a flow of operation during execution of a program in the compiler system 10 according to the embodiment of the present invention.

FIG. 2 shows a flow of operation performed in the compiler system 10 during execution of a program according to the present embodiment.

The dynamic compiler 100 sequentially compiles partial programs to be executed among the partial programs included in a program. The partial program execution section 130 sequentially executes executable instruction streams generated through compilation to perform the program. A partial program may be a method, function, or basic block in a program.

During execution of a program, the partial program execution section 130 first determines whether the next partial program to be executed has been compiled or not (S200). If the partial program has been compiled, the partial program execution section 130 determines whether or not the partial program requires recompilation (S205). The partial program execution section 130 may determine that the partial program requires recompilation if the partial program is frequently executed or optimized and compiled for an execution status different from the current execution status.

If the partial program has not been compiled (S200: No) or it is determined that the partial program requires recompilation (S205: Yes), the partial program execution section 130 indicates to the execution status obtaining section 110 in the dynamic compiler 100 that the partial program is to be compiled.

When receiving the indication of compilation of the partial program from the partial program execution section 130, the execution status obtaining section 110 obtains the execution status of the program from the memory 105 (S210). In particular, the execution status obtaining section 110 obtains the execution status of the program during its runtime from the memory 105 in order to allow the dynamic compilation section 115 performing optimizing compilation of the partial program to refer to the status.

The execution status referred to by the dynamic compilation section 115 to perform optimizing compilation is classified as first execution status that is not updated as a program is executed and second execution status that is updated as the program is executed.

Examples of first execution statuses include:

(1) a compile option specified when the program execution system 90 is executed on the computer, and (2) static class data, such as a byte code, a constant table, and attributes of a class and method, read by the partial program execution section 130 from a Java® class file and stored in the memory 105 when execution of a program is started. In the case of an execution environment in which the program execution system 90 dynamically loads classes, the number of classes which can be referred to increases with the progress of a program. Therefore, the system dump unit 135 stores the contents of the memory 105 on completion of execution of the program as a file. In this way, data about all classes loaded can be stored together.

In the case of an execution environment in which the program execution system 90 can unload classes, a memory area containing the status of unloaded classes may be prevented from being freed by the dynamic compilation section 115. This allows the system dump unit 135 to store data about unloaded classes as a file.

Examples of second execution statuses are listed below.

(3) Dynamic Class Data

Information as to whether a class has been initialized and whether an external reference in a constant table has been resolved.

(4) Class Hierarchy Information

Information concerning the inheritance of classes loaded at the time of compilation of a partial program. For example, information indicating whether a non-abstract, virtual method, an abstract method, or an interface method is not inherited and only one method is implemented in a loaded class.

(5) Data Generated by the Dynamic Compilation Section 115

The dynamic compilation section 115 may store some of the results of analysis during compilation in the memory 105 for use in optimizing compilation of subsequent methods.

(6) Runtime Profile Data

The partial program execution section 130 may collect statistics on behavior of a program such as the frequency of execution of a partial program or the frequency of appearance of a value assigned to a variable as profile data. The dynamic compilation section 115 may refer to the profile data as execution status and use for optimizing compilation.

At S210, the execution status obtaining section 110 obtains both of the first and second execution statuses described above from a first area 106 used as a work area by the dynamic compiler 100 and the partial program execution section 130 during execution of the program in the memory 105.

Then, the dynamic compilation section 115 compiles the partial program according to the first and second execution statuses obtained at S210 to generate an executable instruction stream (S215). Here, the optimizing compilation performed by the dynamic compilation section 115 differs depending on the execution statuses and different executable instruction streams are generated depending on the execution statuses.

Then, the execution status recording section 120 determines whether or not the execution statuses obtained at S210 should be recorded in the memory 105 (S220) and stores in the memory 105 execution statuses that should be recorded (S225). If all execution statuses obtained at S210 were to be stored in the memory 105, a large memory area would be required for storing them and consequently an instruction/ data area used for the program to be executed would be limited and the execution speed of the program would be lowered. Therefore, the execution status recording section 120 records only the execution statuses that meet a predetermined condition in the memory 105 to prevent decrease in the efficiency of execution of the program.

In particular, the execution status recording section 120 determines whether an execution status should be recorded in the memory 105, on the basis of the following conditions.

(1) Execution status of selected partial programs is recorded. The execution status recording section 120 may record in the memory 105, among a plurality of partial programs, the execution status of partial programs that are associated with selection information indicating that their execution status should be contained in a file. Consequently, the replay compilation section 170 can compile those partial programs associated with the selection information indicating that their execution status should be contained in the file to reproduce the same executable instruction streams based on the execution status obtained from the file. On the other hand, it cannot reproduce the same executable instruction streams for partial programs that are not associated with the selection information.

The developer of the dynamic compiler 100 preassigns the selection information indicating that the execution status should be included in the file to partial programs that are likely to cause problems during compilation. Based on the selection information, the execution status recording section 120 records the execution status of the partial programs that are likely to cause problems during compilation and does not record partial programs that have not been selected. Thus, the amount of information about execution status to be recorded can be reduced.

For example, partial programs such as method in standard classes such as those included in "java.lang" and "java.math" in Java® program are unlikely to cause problems during compilation because they are frequently used and have been well tested during the development process of the dynamic compiler 100. On the other hand, partial programs such as methods in application programs that are not included in standard classes are not frequently used compared with partial programs in standard classes and more likely to cause problems during compilation. Therefore, partial programs in standard classes are not assigned the selection information indicating that the execution status should be included in the file whereas partial programs in application programs are assigned the selection information indicating that the execution status should be included in the file so that the execution status recording section 120 can record the execution status of only those partial programs that are likely to cause problems.

(2) The same execution status of the same partial programs is not recorded.

If the obtained execution status of a partial program is the same as the execution status used in previous compilation of that partial program, the execution status recording section 120 does not need to record at least part of the execution status of the partial program in the memory area. Thus, if a partial program has been compiled more than once and is compiled with reference to the same execution status previously referred to, its execution status is not recorded and therefore the partial program will not be able to be subjected to replay compilation with the same execution status. However, because the partial program has been compiled using the same execution status, it is unlikely to cause problems during compilation and the amount of information about the execution status to be recorded can be efficiently reduced. The execution status recording section 120 may use the same execution status to perform replay compilation recorded previously.

The execution status recording section 120 may omit recording the same execution status which has been referred to, provided that no problems such as errors have occurred during compilation in the past.

(3) The execution status of only those partial programs that are regarded as requiring a large amount of processing is recorded. The execution status recording section 120 may limit recording of execution status only to those partial programs that are regarded as requiring a large amount of processing. In particular, the execution status recording section 120 records the execution status of a partial program in a memory area, provided that the size of the partial program is greater than or equal to a predetermined threshold. The execution status recording section 120 does not record the execution status of a partial program if its size is smaller than the threshold. Typically, the larger the size of a program to be compiled, the larger the amount of processing required in compilation. Therefore, the determination described above allows for efficient exclusive recording of the execution status of partial programs that place a large workload on the dynamic compiler 100.

The execution status recording section 120 records the execution status of a partial program in a memory area, provided that the time spent for compilation of the partial program is greater than or equal to a predetermined threshold. The execution status recording section 120 does not need to record the execution status of a partial program the time of which is shorter than the threshold. Typically, the longer the time spent for compilation, the larger the amount of processing during the compilation. Therefore, the above determination also allows for efficient exclusive recording of the execution status of partial programs that place a large workload on the dynamic compiler 100.

The execution status recording section 120 records only the second execution status that is updated in the first area 106 as a result of execution of a program into a second area 107 that is not updated as the program is executed in the memory 105 and does not need to record a duplication of the first execution status into the second area 107. This can reduce the size of execution status information to be recorded in the second area 107 because most of execution statuses referred to by the dynamic compiler 100 for optimization is information classified as the first execution status such as static class data.

In the process described above, the execution status recording section 120 records the address of a location in the memory 105 in which an executable instruction stream generated by the dynamic compilation section 115 is stored along with the execution status. The replay compilation section 170 may use this address for selecting an execution status to be used for replay during replay compilation.

Then, the partial program execution section 130 executes the partial program by executing the executable instruction stream generated by the dynamic compiler 100 (S230). The execution status deleting section 125 determines whether the execution statuses recorded in the memory 105 by the execution status recording section 120 include any execution status that should be deleted (S235). It deletes execution statuses that are unlikely to be referred to during replay compilation by the replay compiler 150 from the memory 105 (S240). This can reduce the number of execution statuses recorded in the memory 105, thereby preventing reduction in the efficiency of memory utilization.

In particular, the execution status deleting section 125 determines whether or not an execution status should be deleted from the memory 105, on the basis of the conditions listed below by way of example.

(1) Execution statuses of a partial program are deleted after a certain period of time elapses from its compilation. Most problems in a partial program that occurred during compilation are detected before it is executed several times after the compilation. Therefore, the execution status deleting section 125 may delete the execution statuses of a partial program that are recorded in a memory area if a time period longer than or equal to a predetermined threshold has elapsed since the partial program was compiled to generate an executable instruction stream.

(2) Execution statuses of a partial program that was executed predetermined times or more after its compilation are deleted. A partial program that was successfully executed predetermined times or more after compilation can be regarded as being properly compiled and unlikely to cause problems in the future. Therefore the execution status deleting section 125 may delete the execution statuses of a partial program that are recorded in a memory area if executable instruction streams generated from compilation of the partial program are executed predetermined times or more.

(3) Execution statuses of a partial program that requires execution time less than or equal to predetermined time are deleted. An executable instruction stream can be regarded as being less complex and less likely to cause problems if executable instruction streams generated from compilation of the partial program are executed within a predetermined time period. Therefore, the execution status deleting section 125 may delete the execution statuses of a partial program that are recorded in a memory area if the execution time of the executable instruction streams generated from compilation of the partial program is less than or equal to a predetermined threshold.

The execution status deleting section 125 may store the execution statuses in a buffer provided on the memory 105 and, when the buffer overflows, may perform any of the processes listed above to delete any of the statuses. In particular, the execution status deleting section 125 may delete, among all the execution statuses in the buffer, the execution status having the longest elapsed time from generation of executable instruction streams, the execution statuses for the partial program having the largest number of execution times, or the execution statuses of the partial program having the shortest execution time, on further condition that the buffer has overflowed.

The execution status recording section 120 may record all execution statuses in the memory 105 at S220 and S225 and the execution status deleting section 125 may determine the lowest-priority execution status, based on any of the conditions for recording execution statuses described with respect to S230 and any of the conditions for deleting execution statuses described with respect to S240 to delete the statuses from the memory 105.

The dynamic compiler 100 and the partial program execution section 130 repeat the process from S200 to S240 described above until the execution of the program ends (S245). As a result, for each of a plurality of partial programs, the execution status obtaining section 110 obtains execution statuses which the dynamic compilation section 115 should refer to during compilation of the partial program at S210. The dynamic compilation section 115 compiles each of the plurality of partial programs based on the execution statuses obtained for the partial program to generate an executable instruction stream for the partial program at S215. The execution status recording section 120 records execution statuses obtained for the partial program in the memory 105 at S220 and S225, for each of a plurality of partial programs. The partial program executing section 130 executes the plurality of partial programs in sequence at S230. At S235 and S240, the execution status deleting section 125 deletes unnecessary execution statuses among the plurality of execution statuses recorded in the memory 105.

After the completion of execution of the program, the system dump unit 135 stores a file containing the contents of the memory 105 in the storage device 140. Thus, the system dump unit 135 can store the execution statuses recorded by the execution status recording section 120 for the plurality of partial programs into the single file. A program of the system dump unit 135 according to the present invention is implemented by an operating system running on the computer executing the dynamic compiler 100 and damps the contents of the memory 105 into a file on completion of execution of the program. Accordingly, the contents of the memory 105, including the execution statuses, can be stored together in the file not only on successful termination of a program by the dynamic compiler 100 and the partial program execution section 130 but also on abnormal termination of the program.

Figure 3:
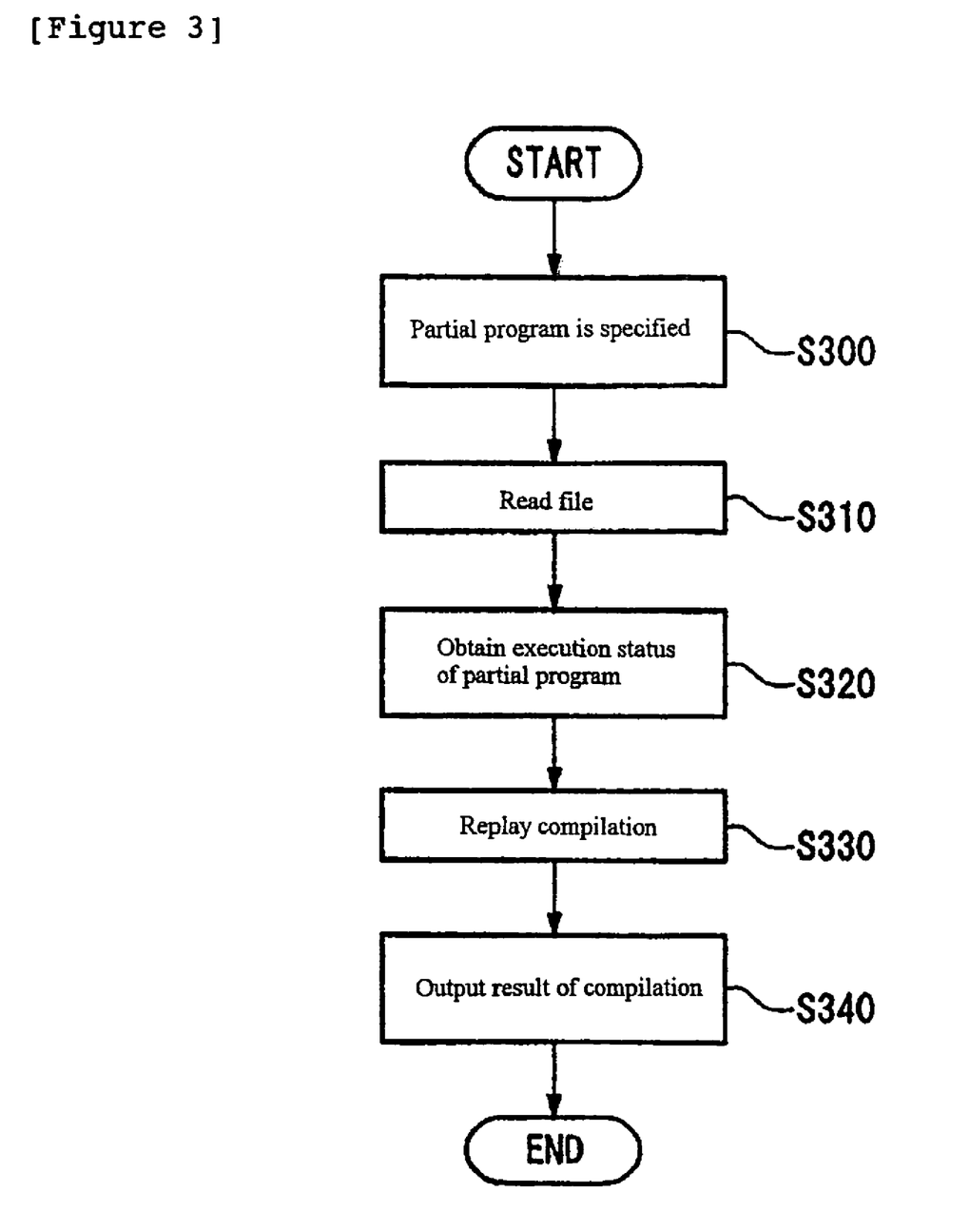
FIG. 3 shows a flow of operation during replay compilation in the compiler system 10 according to the embodiment of the present invention.

FIG. 3 shows a flow of operation of the compiler system 10 during replay compilation according to the present embodiment. The replay compilation section 170 first inputs specification of a partial program to be subjected to replay compilation from the developer of the dynamic compiler 100 (S300). The replay compilation section 170 may receive specification of the address of an executable instruction stream to be reproduced from the developer and identify the partial program from which the executable instruction stream stored at that address is generated as the partial program to be replay-compiled. Thus, the developer can specify a program counter value at the point of time at which a program has been aborted as the address of an executable instruction stream to be reproduced to cause the executable instruction stream that was being executed at the time of the abnormal termination of the program to be reproduced.

Alternatively, the order in which partial programs were compiled may be obtained from the dynamic compilation section 115 and input into the replay compilation section 170 for example, during execution of the program and the replay compilation section 170 may present the order to the developer and receive from the developer specification of a partial program to be replay-compiled among the partial programs whose compilation order is presented.

Then, the file reading section 155 reads a file containing the execution statuses of the partial program from the storage device 140 and stores it in the memory 160 allocated to the replay compiler 150 (S310). Thus, the file reading section 155 stores the contents of the first area 106 and the second area 107 of the memory 105 into a first area 161 and a second area 162, respectively, in the memory 160.

Then, the replay compilation section 170 obtains execution statuses from the memory 160 that have been obtained by the execution status obtaining section 110 for use in compilation of the specified partial program. Thus, the replay compilation section 170 obtains the execution statuses contained in the file stored by the system dump. The replay compilation section 170 then compiles the partial program based on the execution statuses to generate the same executable instruction stream that has been generated by the dynamic compilation section 115 compiling the partial program during execution of the program. Furthermore, the replay compilation section 170 stores the generated executable instruction stream in a third area 163, which is a work area allocated to the replay compiler 150, in the memory 160 (S330).

The replay compilation section 170 provides the result of compilation such as information for debugging obtained through the execution of the replay compilation section 170 to the developer of the dynamic compiler 100 (S340).

According to the compiler system 10 shown in FIGS. 1 to 3, for each of a plurality of partial programs, the execution statuses that have been referred to during compilation of the partial program can be stored in a file through system dump or other means. Then, the replay compiler 150 can obtain the execution statuses from the file and use them to perform replay compilation to generate the same executable instruction stream that has been generated by the dynamic compiler 100. Consequently, the efficiency of debugging of the dynamic compiler 100 can be improved.

In a configuration in which the execution status obtaining section 110 in the dynamic compiler 100 uses a subroutine such as an API provided by the program execution system 90 to obtain execution statuses, the replay compiler program may be implemented by modifying the API in the dynamic compiler 100 that obtains execution status. In particular, in an API that is called by the dynamic compiler 100 and returns execution status to the dynamic compiler 100, a job for referring to a dynamic memory area 406 to obtain the second execution status is replaced with a job for referring to execution status 425. This allows the replay compilation section 170 to obtain the first execution status from the first area 161 containing the contents of the first area 106 and obtain the second execution status from the second area 162 containing the contents of the second area 107. Thus, the replay compiler 150 can be implemented by modifying the API of the dynamic compiler 100.

Figure 4:
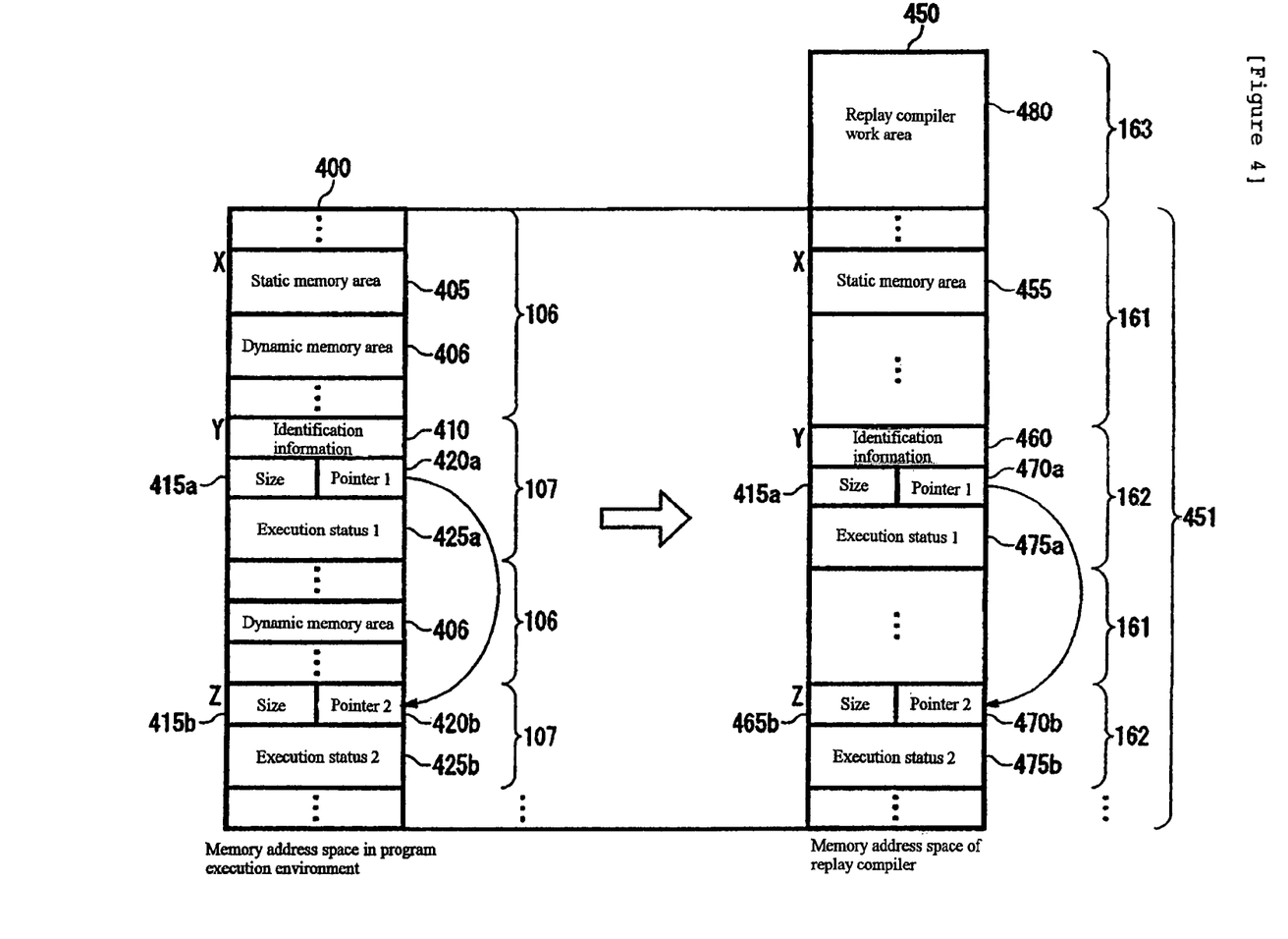
FIG. 4 shows memory address spaces of a dynamic compiler 100 and a replay compiler 150 according to the embodiment of the present invention.

FIG. 4 shows memory address spaces of the program execution system 90 and the replay compiler 150 according to the present embodiment.

A computer functioning as the dynamic compiler 100 and the partial program execution section 130 allocates memory 105 to the dynamic compiler 100 and the partial program execution section 130 in response to a request from the program execution system 90. The memory 105 is mapped to memory address spaces of the dynamic compiler 100 and the partial program execution section 130 as a memory area 400.

In the memory area 400, a static memory area 405 that is not updated as a program is executed and a dynamic memory area 406 that is updated as the program is executed are included in the first area 106, which is a work area used by the dynamic compiler 100 and the partial program execution section 130 for executing the program.

When each partial program is compiled, the execution status obtaining section 110 obtains as execution status to be referred to by the dynamic compilation section 115 during compilation of the program the first execution status that is not updated as the program is executed from the static memory area 405 and obtains the second execution status that is updated as the program is executed from the dynamic memory area 406. The dynamic compilation section 115 compiles the partial program to be compiled based on the first and second execution statuses obtained by the execution status obtaining section 110 to generate an executable instruction stream and stores it in the memory area 400.

The execution status recording section 120 records the second execution status obtained from the dynamic memory area 406 that is updated as the program is executed in the second area 107 that is not updated as the program is executed. In particular, in the second area 107, the execution status 425a, 425b to be recorded for each partial program is associated with a pointer 420a, 420b that specifies the location on the memory area 400 in which the execution status subsequent to that execution status and the pointers are stored in the memory area 400. If, for example, execution status 425*a* is recorded for a partial program and execution status 425*b* is recorded for the next partial program compiled, the execution status recording section 120 associates execution status 425*a* with pointer 420*a* that specifies a location on the memory area 400 in which execution status 425*b* for the next partial program is recorded. Alternatively, the execution status recording section 120 may record a plurality of execution statuses 425 as a data structure, such as a doubly link list structure or a tree structure, other than a singly link list structure.

Furthermore, in the second area 107, the size 415*a*, 415*b* of the execution status 425*a*, 425*b* may be associated and recorded with the execution status 425*a*, 425*b* and the range of the memory area in which each execution status 425*a*, 425*b* is recorded may be specified.

The execution status recording section 120 may associate identification information 410 having a predetermined data value with any of execution statuses 425 and record it in the memory area 400. For example, if the execution status recording section 120 records the execution status 425*a*, 425*b* as a singly list structure using the pointer 420*a*, 420*b*, it may associate and record the static memory area 405 with the execution status 425*a* at the top of the list. This allows the replay compilation section 170 to search the memory area 400 stored as a file for identification information 410 to obtain the execution status 425*a* and follow pointers 420 in sequence starting from pointer 420*a* to obtain each execution status 425.

The partial program execution section 130 executes executable instruction streams stored in the memory area 400 by the dynamic compilation section 115. The execution changes the values of variables in the program and updates dynamic class data. As a result, the contents in the dynamic memory area 406 are updated. After the completion of execution of the program, the system dump unit 135 stores the file containing the contents in the memory area 400 into the storage device 140.

Then, the computer functioning as the replay compiler 150 allocates memory 160 to the replay compiler 150 in response to a request from the replay compiler 150. The memory 160 is mapped to the memory address space of the replay compiler 150 as a memory area 450.

The file reading section 155 then reads the file from the storage device 140 and stores the contents of the memory area 400 allocated on the memory 105 into the memory 160 as a memory area 451 included in the memory area 450. Here, the file reading section 155 stores the contents of the memory area 400 in such a manner that the address position in the memory address space of the replay compilation section 170 is identical to address position of the memory area 400 in the memory address space of the dynamic compilation section 115. Consequently, the static memory area 405 stored at address X in the memory area 400 is stored in the memory area 451 as the static memory area 455 located at address X. Likewise, the identification information 410, size 415*a*, 415*b*, pointer 420*a*, 420*b*, and execution status 425*a*, 425*b* in the memory area 400 are stored in the memory area 451 as identification information 460, size 465*a*, 465*b*, pointer 470*a*, 470*b*, and execution status 475*a*, 475*b*, respectively. The dynamic memory area 406 is updated as the program is executed and consequently the execution status used for compiling the partial program is lost.

The replay compiler 150 uses a work area 480, which is a third area 163 that does not overlap the memory area 400 read from the file and stored in the memory 160, as a work area used in replay compilation. Accordingly, the replay compilation section 170 can refer to the memory area 400 without overwriting the contents on the completion of execution of the program.

In response to a direction to perform replay compilation of a partial program the replay compilation section 170 obtains from the memory area 451 the execution status that has been referenced by the dynamic compilation section 115 during compilation of the partial program and compiles the partial program based on the execution status to generate the same executable instruction stream that has been generated by the dynamic compilation section 115.

For referring to a first status, which is not updated as the program is executed, the replay compilation section 170 uses the same address that has been used by the dynamic compilation section 115 to refer to the first execution status and has been stored by the file reading section 155 in the memory area 451 stored in the memory 105. Thus, the replay compilation section 170 can obtain the same first execution status by performing the same process as that performed by the dynamic compilation section 115.

The replay compilation section 170 follows pointers 470, starting from the pointer 470 paired with a second execution status 475 obtained for any of the partial programs in the memory area 400 obtained from the file, to identify the location on the memory area 451 in which the execution status 475 obtained for the partial program is recorded and obtain the second execution status 475.

If identification information 410 has been recorded by the execution status recording section 120, the replay compilation section 170 searches the memory area 451 in which the contents in the memory area 400 obtained from the file are stored for the identification information 460, which is a predetermined data value, to identify the location in the memory area 451 in which an execution status 475*a* associated with the identification information 460 is stored. Then, the replay compilation section 170 follows pointers 470, starting from the pointer 470*a* paired with the execution status 475*a*, to identify the location in the memory area 451 in which the execution status 475 obtained for the partial program is stored and obtain the execution status 475 for the partial program. Thus, the replay compilation section 170 can properly select and obtain the execution status 475 of the partial program to be subjected to replay compilation from the memory area 451.

According to the compiler system 10 described above, the execution status recording section 120 can obtain from the first area 106, which is updated as a program is executed, the second execution status that has been referred to by the dynamic compilation section 115 during compilation of a partial program and record it in the second area 107 for storing in the storage device 140. Thus, the replay compilation section 170 can properly obtain from the contents in the memory area 400 obtained from the file the execution status obtained for the partial program specified for replay compilation and generate the same executable instruction stream that has been generated by the dynamic compilation section 115. Thus, the compiler system 10 can perform replay compilation of a particular partial program in which a problem has occurred during compilation, without rerunning the entire program on the program execution system 90 to attempt to cause the same problem.

Figure 5:
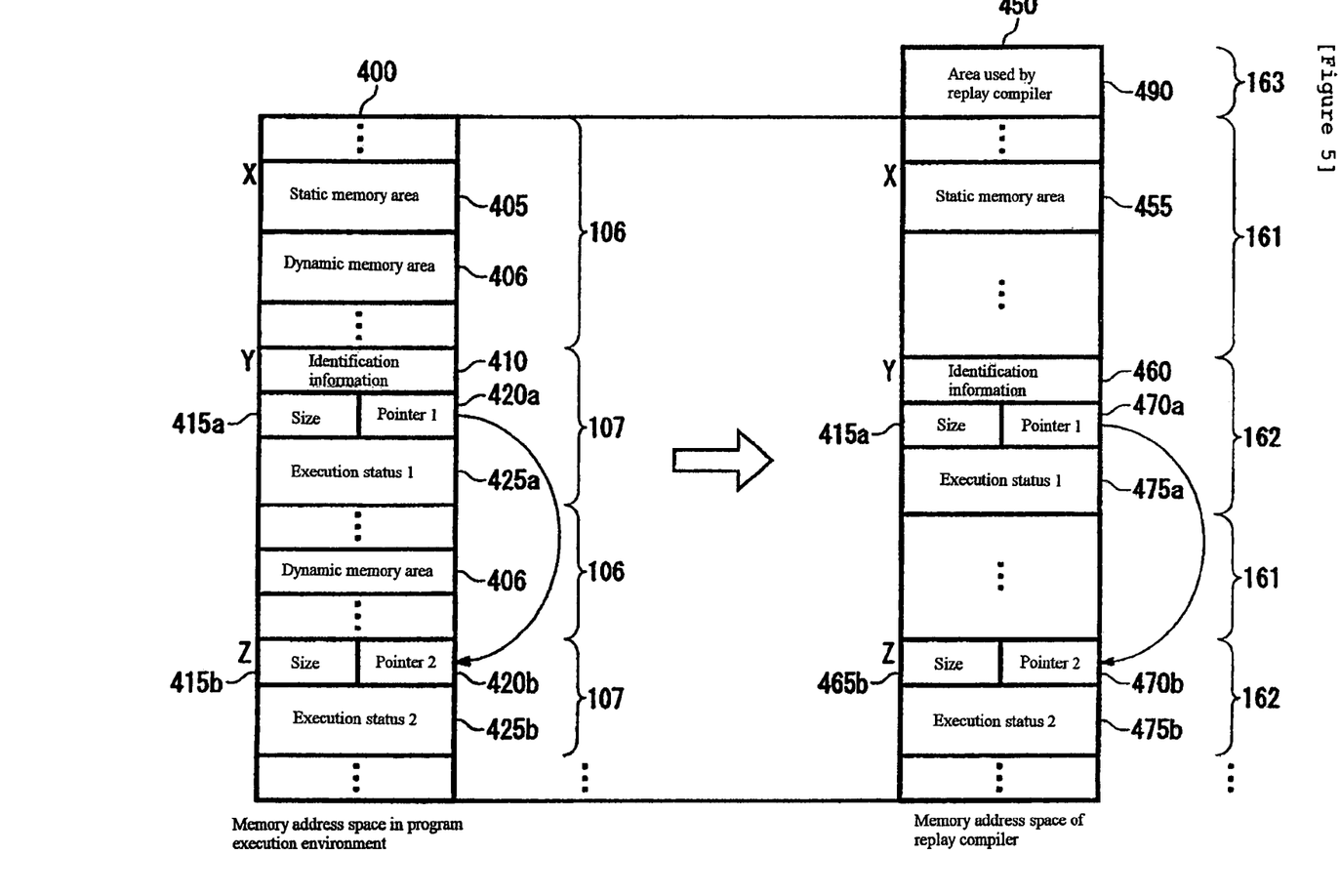
FIG. 5 shows memory address spaces of a dynamic compiler 100 and a replay compiler 150 according to a variation of the embodiment of the present invention.

FIG. 5 shows memory address spaces of a dynamic compiler 100 and a replay compiler 150 according to a variation of the present embodiment. Memory areas in FIG. 5 that are labeled with the same reference numerals as those in FIG. 4 are the same as the memory areas with those same reference numerals in FIG. 4 and therefore description of which will be omitted, except for differences.

A file reading section 155 reads a file recorded in a storage device 140 and stores the contents of a memory area 400 allocated on a memory 105 into a memory 160 as a memory area 451 included in the memory area 450. The file reading section 155 stores the contents of the memory area 400 into the memory 160 in such a manner that an address position in the memory address space of the replay compilation section 170 is the same as the address position of the memory area 400 in the memory address space of the dynamic compilation section 115. For address positions other than the address positions of a used area 490 in the memory 160 used by the replay compilation section 170, the file reading section 155 according to the present variation stores the contents of the memory area 400 allocated on the memory 105 as a memory area 451.

If almost identical compilation modules are used as the dynamic compilation section 115 and the replay compilation section 170, the used area 490, which is a third area 163 used by the replay compilation section 170 before the memory area 400 is read, corresponds to the memory area 400 that has been used by the dynamic compiler 100 and a partial program execution section 130 during initialization performed before the program is executed on the program execution system 90. Accordingly, an execution status to be used in replay compilation is not stored in the used area 490. The replay compilation section 170 can perform replay compilation if the contents of the memory area 400 at the address positions other than the address positions in the used area 490 are restored. According to the present variation, the replay compilation section 170 can be run using the same work area that is used by a program execution system 90. Therefore, differences between the dynamic compilation section 115 and the replay compilation section 170 are small compared with the differences between the dynamic compilation section 115 and the replay compilation section 170 shown in FIG. 4.

Figure 6:
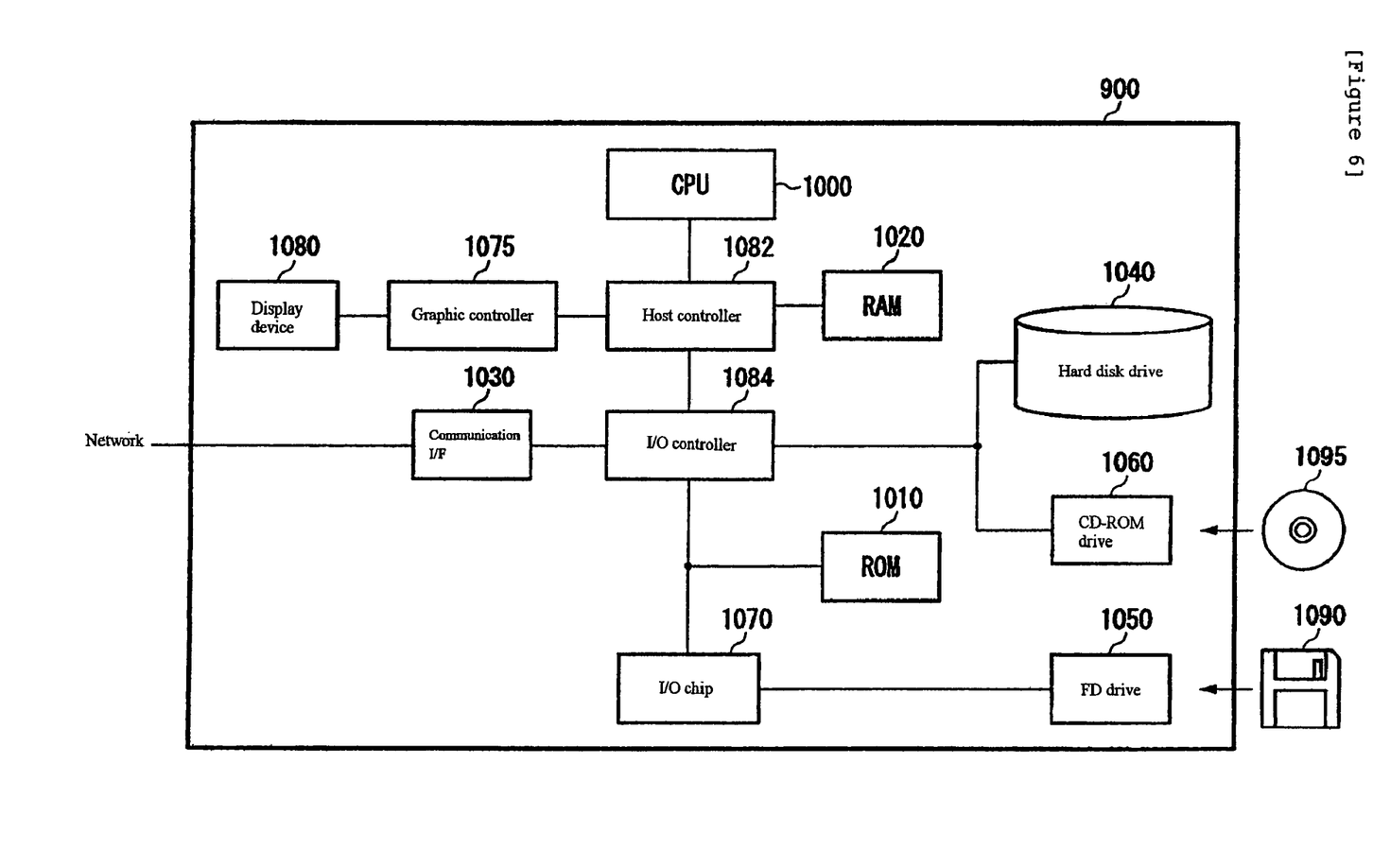
FIG. 6 shows an exemplary hardware configuration of a computer 900 according to the embodiment of the present invention.

FIG. 6 shows an exemplary hardware configuration of a computer 900 according to the present embodiment. The computer 900 according to the present embodiment includes a CPU section including CPU 1000, a RAM 1020, a graphic controller 1075, and a display device 1080 which are interconnected through a host controller 1082, an input/output section including a communication interface 1030, a hard disk drive 1040, and a CD-ROM drive 1060 which are connected to the host controller 1082 through an input/output controller 1084, and a legacy input/output section including a ROM 1010, a flexible disk drive 1050, and an input/output chip 1070 which are connected to the input/output controller 1084.

The host controller 1082 connects the RAM 1020 with the CPU 1000 and the graphic controller 1075, which access the RAM. 1020 at a high transfer rate. The CPU 1000 operates according to a program stored in the ROM 1010 and the RAM 1020 to control components of the computer. The RAM 1020 functions as the memory 105 and/or the memory 160 shown in FIG. 1. The graphic controller 1075 obtains an image data generated by the CPU 1000 or other means on a frame buffer provided in the RAM 1020 and displays it on the display device 1080. Alternatively, the graphic controller 1075 may contain within it a frame buffer for storing image data generated by the CPU 1000 or other means.

The input/output controller 1084 connects the host controller 1082 with relatively fast input/output devices such as the communication interface 1030, the hard disk drive 1040, and CD-ROM drive 1060. The communication interface 1030 communicates with an external device through a network. The hard disk drive 1040 stores the assistance program and data used by the CPU 1000 in the computer 900. The hard disk drive 1040 functions as the storage device 140 shown in FIG. 1. The CD-ROM drive 1060 reads the assistance program or data from a CD-ROM 1095 and provides it to the hard disk drive 1040 through the RAM 1020.

Also connected to the input/output controller 1084 are relatively low speed input/output devices such as the ROM 1010, the flexible disk drive 1050, and the input/output chip 1070. The ROM 1010 stores a boot program to be executed by the computer 900 on activation and programs dependent on the hardware of the computer 900. The flexible disk drive 1050 reads the assistance program or data from a flexible disk 1090 and provides it to the hard disk drive 1040 through the RAM 1020. The input/output chip 1070 provides connection to the flexible disk drive 1050 and various other input/output devices through a parallel port, a serial port, a keyboard port, mouse port, or the like.

A program to be provided to the hard disk drive 1040 through the RAM 1020 is stored in a recording medium such as a flexible disk 1090, CD-ROM 1095, or IC card and provided by a user to the hard disk drive 1040. The program is read from a recording medium, installed in the hard disk drive 1040 through the RAM 1020, and executed on the CPU 1000 in the computer 900.

The compiler program installed in the computer 900 and causing the computer 900 to function as the compiler system 10 includes a dynamic compiler program, a partial program execution module, and a replay compiler program. These programs or modules operate on the CPU 1000 to cause the computer 900 to function as the dynamic compiler 100, partial program execution section 130, and replay compiler 150.

The dynamic compiler program includes an execution status obtaining module, a dynamic compilation module, an execution status recording module, and an execution status deleting module. These programs or modules operate on the CPU 1000 to cause the computer 900 to function as the execution status obtaining section 110, dynamic compilation section 115, execution status recording section 120, and the execution status deleting section 125. The dynamic compiler program may further include a system dump module that causes the computer 900 to function as the system dump unit 135.

The replay compiler program includes a file reading module and a replay compilation module. These programs or modules operate on the CPU 1000 to cause the computer 900 to function as the file reading section 155 and replay compilation section 170. The replay compiler program may be executed on a computer 900 different from the computer 900 that functions as the program execution system 90.

The programs or modules described above may be stored in an external storage medium. The storage medium may be a flexible disk 1090 or a CD-ROM 1095, or an optical recording medium such as a DVD or PD, a magneto-optical recording medium such as an MD, a tape medium, or semiconductor memory such as an IC card. The program may be stored in a storage device used as the recording medium, such as a hard disk or RAM provided in a server system on a private communication network or the Internet and provided to the computer 900 over the network.

While the present invention has been described with respect to embodiments thereof, the technical scope of the present invention is not limited to the specifics described with respect to those embodiments. It will be apparent to those skilled in the art that various changes or modification can be made to the embodiments. It will be apparent from the Claims that embodiments including those changes and modifications are also included in the technical scope of the present invention.

According to the embodiments described above, the compiler program, dynamic compiler program, replay compiler program, replay compiler, compilation method, and recording medium in items as described below are provided.

(1) A compiler program that causes a computer to sequentially compile partial programs to be executed among a plurality of partial programs included in a program during execution of the program, causing the computer to function as: an execution status obtaining section for obtaining an execution status of the program; a dynamic compilation section for compiling one of the partial programs to be executed during execution of the program, on the basis of the execution status, to generate an executable instruction stream that differs depending on the execution status; an execution status recording section for recording the execution status in a memory area allocated on a memory of the computer; a file reading section for reading a file containing contents of the memory area allocated on the memory, the file being stored in a storage device by the computer; and a replay compilation section for compiling the one partial program on the basis of the execution status obtained from the file to generate the same executable instruction stream as the executable instruction stream generated by the dynamic compilation section during the execution of the program.

(2) The compiler program according to item (1), wherein the computer causes an operating system running on the computer to perform a system dump to dump contents in the memory area allocated on the memory to store the file into the storage device; and the replay compilation section compiles the one partial program on the basis of the execution status obtained from the file stored using the system dump.

(3) The compiler program according to item (1), wherein the execution status obtaining section obtains, for each of the plurality of partial programs, the execution status to be referred to by the dynamic compilation section during compilation of the partial program; the dynamic compilation section compiles each of the plurality of programs on the basis of the execution status obtained for the partial program to generate the executable instruction stream for the partial program; the execution status recording section records, for each of the plurality of partial programs, the execution status obtained for the partial program in the memory area allocated on the memory of the computer; the computer stores into the storage device, the file containing contents of the memory area allocated on the memory, after the execution of the program is completed; and the replay compilation section obtains, from the file, the execution status obtained for the one partial program and compiles the one partial program on the basis of the execution status to generate the same executable instruction stream as the executable instruction stream that has been generated by the dynamic compilation section by compiling the one partial program during execution of the program.

(4) The compiler program according to item (3), wherein the executable status recording section associates each of the plurality of partial programs with the execution status obtained for the partial program and records in the memory area a pointer specifying a location on the memory area at which the execution status subsequent to the execution status is recorded; the replay compilation section sequentially follows the pointers in the contents of the memory area obtained from the file, starting from the pointer paired with the execution status obtained for any of the partial programs, to identify a location on the memory area at which the execution status obtained for the partial program is recorded and obtain the execution status.

(5) The compiler program according to item (4), wherein the execution status recording section associates predetermined identification information with any of the execution statuses and records the identification information in the memory area; and the replay compilation section searches the contents of the memory area obtained from the file for the identification information to identify the location on the memory at which the execution status associated with the identification information is stored, and follows the pointers, starting from a pointer paired with the execution status, to identify a location on the memory area at which the execution status obtained for the one partial program and obtain the execution status.

(6) The compiler program according to item (1), wherein the execution status obtaining section obtains from a first area in the memory area a first execution status which is not updated as the program is executed and a second execution status which is updated as the program is executed; the execution status recording section records the second execution status in a second area in the memory area, the second area not being updated as the program is executed; and the dynamic compilation section compiles the one partial program on the basis of the first and second execution statuses obtained from the first area; and the replay compilation section compiles the one partial program on the basis of the first execution status obtained from the first area included in the file and stored and the second execution status obtained from the second area included in the file and stored.

(7) The compiler program according to item (6), wherein the file reading section reads the file from the storage device and stores in the memory the contents of the memory area allocated on the memory so that an address position in a memory address space of the replay compilation section is identical to an address position of the memory area in a memory address space of the dynamic compilation section; and the replay compilation section uses the same address that has been used by the dynamic compilation section for referring to the first execution status to refer to the first execution status stored in the memory by the file reading section.

(8) The compiler program according to item (7), wherein, for address positions other than an address position used by the replay compilation section, the file reading section stores in the memory the contents of the memory area allocated on memory so that an address position in a memory address space of the replay compilation section is identical to an address position of aid memory area in a memory address space of the dynamic compilation section.

(9) The compiler program according to item (1), wherein the execution status recording section records in the memory area the execution status for the partial program, among the plurality of partial programs, that is associated with selection information indicating that the execution status is to be contained in the file; and the replay compilation section compiles, on the basis of the execution status obtained from the file, the one partial program associated with the selection information indicating that the execution status is to be contained in the file.

(10) The compiler program according to item (1), wherein the execution status recording section does not record in the memory area at least part of the execution status for the one partial program if the execution status obtained for the one partial program is the same as the execution status used in previous compilation of the one partial program.

(11) The compiler program according to item (1), wherein the execution status recording section records in the memory area the execution status for the one partial program, provided that the size of the one partial program is greater than or equal to a predetermined threshold.

(12) The compiler program according to item (1), wherein the execution status recording section records in the memory the execution status for the one partial program, provided that time spent for compiling the one partial program is greater than or equal to a predetermined threshold.

(13) The compiler program according to item (1), further causing the computer to function as an execution status deleting section for deleting the execution status for the one partial program recorded on the memory area if time equal to or longer than a predetermined threshold has been elapsed since the one partial program was compiled and the executable instruction stream was generated.

(14) The compiler program according to item (1), further causing the computer to function as an execution status deleting section for deleting the execution status for the one partial program recorded in the memory area if the executable instruction stream generated by compiling the one partial program is executed a predetermined number of times or more.

(15) The compiler program according to item (1), further causing the computer to function as an execution status deleting section for deleting the execution status for the one partial program recorded on the memory area if time required for processing the executable instruction stream generated by compilation of the one partial program is shorter or equal to a predetermined threshold.

(16) A replay compiler program that causes a computer to generate the same executable instruction stream as an executable instruction stream generated by a dynamic compiler program that causes a computer to sequentially compile partial programs to be executed among a plurality of partial programs included in a program during execution of the program; wherein the dynamic compiler program causes the computer to obtain an execution status of the program, compile one of the partial programs to be executed on the basis of the execution status to generate an executable instruction stream that differs depending on the execution status, and record the execution status in a memory area allocated on a memory of the computer; the computer stores in a storage device a file containing contents of the memory area allocated on the memory; and the replay compiler program causes the computer to function as: a file reading section for reading the file from the storage device; and a replay compilation section for compiling the one partial program on the basis of the execution status obtained from the file to generate the same executable instruction stream as the executable instruction stream generated by the compilation section.

(17) A replay compiler that generates the same executable instruction stream as an executable instruction stream generated by a dynamic compiler program that causes a computer to sequentially compile partial programs to be executed among a plurality of partial programs included in a program during execution of the program; wherein the dynamic compiler program causes the computer to obtain an execution status of the program, compile one of the partial programs to be executed to generate an executable instruction stream that differs depending on the execution status, and record the execution status in a memory area allocated on a memory of the computer; the computer stores in a storage device a file containing the contents of the memory area allocated on the memory; and the replay compiler comprises: a file reading section for reading the file from the storage device; and a replay compilation section for compiling the one partial program on the basis of the execution status obtained from the file to generate the same executable instruction stream as the executable instruction stream generated by the compilation section.

(18) A dynamic compiler program that causes a computer to sequentially compile partial programs to be executed among a plurality of partial programs included in a program during execution of the program, causing the computer to function as: an execution status obtaining section for obtaining, for each of the plurality of partial programs, the execution status to be referred to by the dynamic compilation section during compilation of the partial program; a dynamic compilation section for compiling each of the plurality of programs on the basis of the execution status obtained for the partial program to generate the executable instruction stream for the partial program; and an execution status recording section for recording, for each of the plurality of partial programs, the execution status obtained from for the partial program and a pointer specifying a location on the memory area at which the execution status subsequent to the execution status is recorded, into a memory area allocated on a memory of the computer.

(19) A compilation method for causing a computer to sequentially compile partial programs to be executed among a plurality of partial programs included in a program during execution of the program, the compilation method comprising: an execution status obtaining step causing the computer to obtain an execution status of the program; a dynamic compilation step of causing the computer to compiling one of the partial programs to be executed during execution of the program, on the basis of the execution status, to generate an executable instruction stream that differs depending on the execution status; an execution status recording step of causing the computer to record the execution status in a memory area allocated on a memory of the computer; a file storing step of causing the computer to store a file containing contents of a memory area allocated on the memory into a storage device; a file reading step of causing the computer to read a file containing contents of the memory area allocated on the memory, the file being stored in the storage device by the computer; and a replay compilation step of causing the computer to compile the one partial program on the basis of the execution status obtained from the file to generate the same executable instruction stream as the executable instruction stream generated by the dynamic compilation step during the execution of the program.

(20) A computer-readable recording medium on which a program according to any of Items (1), (16), and (18) is recorded.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A computer system comprising a computer-readable recording medium having a compiler program for reproducing a same executable instruction stream as an executable instruction stream generated by a dynamic compiler to facilitate debugging of the dynamic compiler, said compiler program comprising a first program that causes a computer to sequentially compile partial programs to be executed among a plurality of partial programs included in a second program during execution of the second program, causing said computer to function as:

an execution status obtaining section for obtaining an execution status of said second program;

a dynamic compilation section for compiling one of said partial programs to be executed during execution of said second program, on the basis of said execution status, to generate an executable instruction stream that differs depending on said execution status;

an execution status recording section for recording said execution status in a memory area allocated on a memory of said computer;

a file reading section for reading a file containing contents of the memory area allocated on said memory, said file being stored in a storage device by said computer; and a replay compilation section for compiling said one partial program on the basis of said execution status obtained from said file to generate the same executable instruction stream as said executable instruction stream generated by said dynamic compilation section during the execution of said second program.

2. The compiler program according to claim 1, wherein said computer causes an operating system running on said computer to perform a system dump to dump contents in said memory area allocated on said memory to store said file into said storage device; and said replay compilation section compiles said one partial program on the basis of said execution status obtained from said file stored using said system dump.

3. The compiler program according to claim 1, wherein said execution status obtaining section obtains, for each of said plurality of partial programs, said execution status to be referred to by said dynamic compilation section during compilation of said partial program;

said dynamic compilation section compiles each of said plurality of partial programs on the basis of said execution status obtained for said partial program to generate said executable instruction stream for said partial program;

said execution status recording section records, for each of said plurality of partial programs, said execution status obtained for said partial program in said memory area allocated on said memory of said computer;

said computer stores into said storage device, said file containing contents of the memory area allocated on said memory, after the execution of said program is completed; and said replay compilation section obtains, from said file, said execution status obtained for said one partial program and compiles said one partial program on the basis of said execution status to generate the same executable instruction stream as said executable instruction stream that has been generated by said dynamic compilation section by compiling said one partial program during execution of said program.

4. The compiler program according to claim 3, wherein said executable status recording section associates each of said plurality of partial programs with said execution status obtained for said partial program and records in said memory area a pointer specifying a location on said memory area at which the execution status subsequent to said execution status is recorded;
    said replay compilation section sequentially follows said pointers in the contents of said memory area obtained from said file, starting from the pointer paired with said execution status obtained for any of said partial programs, to identify a location on said memory area at which said execution status obtained for said partial program is recorded and obtain said execution status.

5. The compiler program according to claim 4, wherein said execution status recording section associates predetermined identification information with any of said execution statuses and records said identification information in said memory area; and
    said replay compilation section searches the contents of said memory area obtained from said file for said identification information to identify the location on said memory at which said execution status associated with said identification information is stored, and follows said pointers, starting from a pointer paired with said execution status, to identify a location on said memory area at which said execution status obtained for said one partial program and obtain said execution status.

6. The compiler program according to claim 1, wherein said execution status obtaining section obtains from a first area in said memory area a first execution status which is not updated as said program is executed and a second execution status which is updated as said program is executed;
    said execution status recording section records said second execution status in a second area in said memory area, said second area not being updated as said program is executed; and
    said dynamic compilation section compiles said one partial program on the basis of said first and second execution statuses obtained from said first area; and
    said replay compilation section compiles said one partial program on the basis of said first execution status obtained from said first area included in said file and stored and said second execution status obtained from said second area included in said file and stored.

7. The compiler program according to claim 6, wherein said file reading section reads said file from said storage device and stores in said memory the contents of said memory area allocated on said memory so that an address position in a memory address space of said replay compilation section is identical to an address position of said memory area in a memory address space of said dynamic compilation section; and
    said replay compilation section uses the same address that has been used by said dynamic compilation section for referring to said first execution status to refer to said first execution status stored in said memory by said file reading section.

8. The compiler program according to claim 7, wherein, for address positions other than an address position used by said replay compilation section, said file reading section stores in said memory the contents of said memory area allocated on memory so that an address position in a memory address space of said replay compilation section is identical to an address position of aid memory area in a memory address space of said dynamic compilation section.

9. The compiler program according to claim 1, wherein said execution status recording section records in said memory area said execution status for said partial program, among said plurality of partial programs, that is associated with selection information indicating that said execution status is to be contained in said file; and
    said replay compilation section compiles, on the basis of said execution status obtained from said file, said one partial program associated with said selection information indicating that said execution status is to be contained in said file.

10. The compiler program according to claim 1, wherein said execution status recording section does not record in said memory area at least part of said execution status for said one partial program if said execution status obtained for said one partial program is the same as said execution status used in previous compilation of said one partial program.

11. The compiler program according to claim 1, wherein said execution status recording section records in said memory area said execution status for said one partial program, provided that the size of said one partial program is greater than or equal to a predetermined threshold.

12. The compiler program according to claim 1, wherein said execution status recording section records in said memory said execution status for said one partial program, provided that time spent for compiling said one partial program is greater than or equal to a predetermined threshold.

13. The compiler program according to claim 1, further causing said computer to function as an execution status deleting section for deleting said execution status for said one partial program recorded on said memory area if time equal to or longer than a predetermined threshold has been elapsed since said one partial program was compiled and said executable instruction stream was generated.

14. The compiler program according to claim 1, further causing said computer to function as an execution status deleting section for deleting said execution status for said one partial program recorded in said memory area if said executable instruction stream generated by compiling said one partial program is executed a predetermined number of times or more.

15. The compiler program according to claim 1, further causing said computer to function as an execution status deleting section for deleting said execution status for said one partial program recorded on said memory area if time required for processing said executable instruction stream generated by compilation of said one partial program is shorter or equal to a predetermined threshold.

* * * * *